F. C. EMRICK.
HIGH PRESSURE PACKLESS VALVE.
APPLICATION FILED DEC. 5, 1910.
1,012,067.
Patented Dec. 19, 1911.
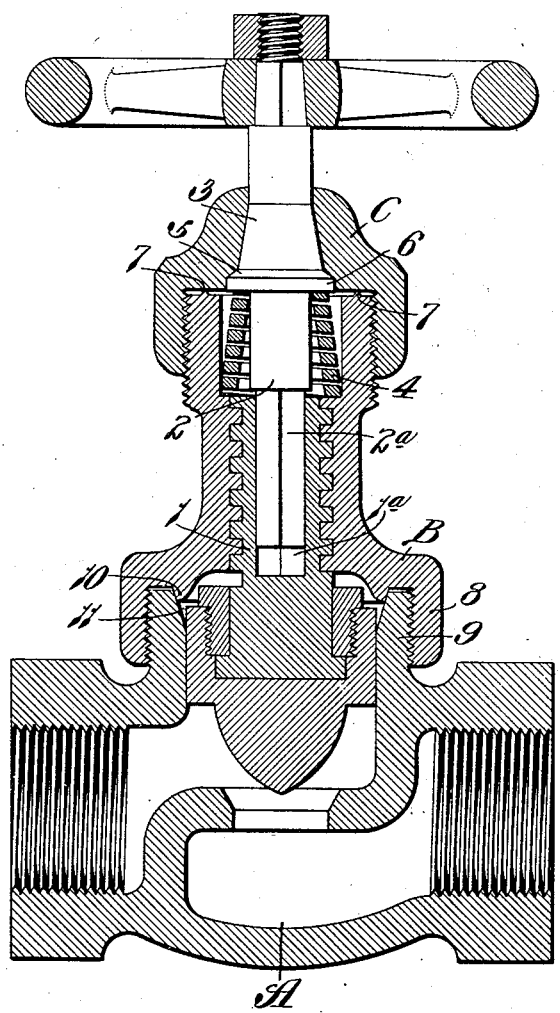
Witnesses:
Geo. R. Ladson
Wells L. Church
Inventor,
Frank C. Emrick.
By Paul Bakewell Atty.

UNITED STATES PATENT OFFICE.

FRANK C. EMRICK, OF ST. LOUIS, MISSOURI, ASSIGNOR TO LEO J. KADESKI, OF ST. LOUIS, MISSOURI.

HIGH-PRESSURE PACKLESS VALVE.

1,012,067.  Specification of Letters Patent.  Patented Dec. 19, 1911.

Application filed December 5, 1910. Serial No. 595,673.

*To all whom it may concern:*

Be it known that I, FRANK C. EMRICK, a citizen of the United States, residing at St. Louis, Missouri, have invented a certain new and useful Improvement in High-Pressure Packless Valves, of which the following is a full, clear, and exact description, such as will enable others skilled in the art to which it appertains to make and use the same.

This invention relates to valves, and particularly to packless valves, namely, valves of the type in which no packing is used for preventing leakage around the valve stem.

One object of my invention is to provide a high-pressure packless valve which is so designed that there is no liability of the stems sticking or becoming jammed so tightly that it cannot be turned easily.

Another object is to provide a valve of the type referred to in which the casing, bonnet and cap are so constructed that leakage between said parts is absolutely prevented.

Another object is to provide a valve that comprises only a few parts which are so designed that absolutely tight joints can be produced without the necessity of forming ground faces, thereby enabling the valve to be manufactured at a low cost.

Other objects and desirable features of my invention will be hereinafter pointed out.

The figure of the drawings is a vertical sectional view of a valve constructed in accordance with my invention.

Referring to the drawing which illustrates the preferred form of my invention, A designates the casing of the valve, B designates the bonnet, and C the cap at the upper end of the bonnet. The stem of the valve consists of two parts 1 and 2 that can move longitudinally relatively to each other, the lower part 1 of the stem being provided with a screw-threaded portion that passes through an internally screw-threaded bore in the bonnet, and the upper part 2 of the stem being provided with a non-circular extension $2^a$ that fits in a non-circular-shaped socket $1^a$ in the lower part 1 of the stem.

The upper part 2 of the stem is provided with a long tapered portion 3 that fits in a correspondingly-shaped seat formed in the cap C, and a coiled expansion spring 4 is employed for forcing the upper part 2 of the stem upwardly so as to hold the tapered portion 3 thereof tightly seated. Means is provided for preventing said tapered portion from becoming stuck or wedged so tightly in its seat that the stem cannot be turned easily, and in the embodiment of my invention herein shown, said means consists of a beveled surface 5 on the upper part 2 of the stem arranged below the tapered portion 3 and flaring outwardly from the base of said tapered portion in such a manner that it limits the upward movement of the part 2 of the stem, the angle of said surface 5 being greater than the angle of the tapered portion 3. This beveled surface 5 is preferably formed on the upper edge of a collar 6 on the part 2 of the stem, and while I prefer to form the portion 3 with a tapered surface of approximately 10° and the surface 5 at approximately 35 or 40°, I wish it to be clearly understood that the exact angle of these surfaces is immaterial so far as my broad idea is concerned so long as the beveled surface 5 is of great enough angle to prevent the tapered portion 3 of the stem from sticking or becoming wedged in its seat.

The long gradually tapered portion 3 of the stem insures an absolutely tight joint between the stem and the cap, and while the main function of the beveled surface 5 is to limit the upward movement of the stem and prevent jamming of same, this beveled surface 5 also tends to prevent leakage around the stem. This feature of providing the stem of the valve with two tapered or beveled surfaces of different angles is applicable to various types of valves so that I do not wish it to be understood that this feature is limited to use in a valve of the type or construction herein shown.

The cap C is screwed onto the upper end of the bonnet B, and one of the horizontally disposed coöperating surfaces of said parts is provided with an annular rib 7 that will be mashed down and thus produce an absolutely tight joint between said parts when the cap C is screwed down or tightened. I have herein shown the rib 7 arranged on the upper end of the bonnet B but it will, of course, be understood that the same result could be obtained by arranging said rib on the cap C.

The bonnet B is provided at its lower end with an integral ring-shaped flange 8 having integral screw-threads that coöperate with external screw-threads on a ring-shaped flange 9 on the casing A. Said bonnet is also provided with an annular tapered rib 10 that fits in a tapered recess 11 formed on the inner surface of the flange 9 on the casing adjacent the upper end of said flange. This annular rib 10 and tapered recess 11 can be machined for there is enough resiliency in the rib 10 to cause it to snugly embrace the wall of the recess 11 when the bonnet is screwed down into position, thereby producing an absolutely tight joint between the bonnet and the casing A. By constructing the bonnet in this manner I overcome the necessity of using a union for connecting the bonnet to the casing, and I also obtain an absolutely tight joint between these parts without the necessity of grinding said parts.

A valve of the construction above described is admirably adapted for use on high-pressure lines for the long tapered portion 3 on the valve stem and the coöperating seat for same in the cap insures a tight joint around the valve stem, and the beveled surface 5 at the base of said tapered portion overcomes any possibility of the stem becoming jammed so tightly in its seat that it cannot be turned easily. The rib 7 on the upper end of the bonnet and the annular tapered rib 10 on the lower end of the bonnet insure tight joints between the bonnet and cap and between the bonnet and casing, and as the valve comprises only a few parts which can be machined easily it can be manufactured at a low cost.

Having thus described my invention, what I claim as new and desire to secure by Letters Patent is:

1. A valve comprising a casing provided with an externally screw-threaded flange, a bonnet provided with an integral ring-shaped flange that surrounds the flange on the casing, a cap screwed onto the upper end of said bonnet, an annular tapered rib on said bonnet that fits snugly in a tapered recess in said casing, a valve stem provided with a tapered portion that fits in a seat in said cap, yielding means which exerts pressure on said stem and thus holds the tapered portion thereof seated, and a beveled surface on said stem at the base of said tapered portion for preventing said tapered portion from jamming or sticking tightly in its seat.

2. A valve comprising a casing, a bonnet connected to said casing, a cap screwed onto the upper end of said bonnet, an annular tapered rib on said bonnet that fits snugly in a tapered opening in said casing, an annular rib on the upper end of the bonnet that is adapted to be mashed down by the cap when the cap is tightened, a valve stem having a long gradually tapered portion that fits in a seat in the cap, a collar on said stem having a beveled surface that flares outwardly from the base of said tapered portion and thus tends to prevent said tapered portion from sticking in its seat, and a spring on said stem arranged under said collar.

In testimony whereof I hereunto affix my signature in the presence of two witnesses, this thirtieth day of November 1910.

FRANK C. EMRICK.

Witnesses:
WELLS L. CHURCH,
GEORGE BAKEWELL.